United States Patent

Thompson

[15] 3,678,374
[45] July 18, 1972

[54] SERVOED TRANSDUCER SYSTEM WITH CURRENT OUTPUT CIRCUIT

[72] Inventor: Burton J. Thompson, Mount Lake Terrace, Wash.

[73] Assignee: Sundstrand Data Control, Inc.

[22] Filed: Jan. 6, 1970

[21] Appl. No.: 966

[52] U.S. Cl. .............................323/90, 73/398 C, 318/662, 323/93, 324/61 R, 340/187, 340/200
[51] Int. Cl. ..................................G05d 13/62, G05d 15/01
[58] Field of Search .....................73/304 C, 398 C; 318/662; 323/1, 4, 52, 75 P, 90, 92, 93, 100; 324/61 R, 61 S; 340/187, 200

[56] References Cited

UNITED STATES PATENTS

| | | |
|---|---|---|
| 2,734,736 | 2/1956 | Payne..................................73/398 C |
| 2,829,334 | 4/1958 | Murnighan............................323/4 X |
| 3,117,310 | 1/1964 | Roper et al. .........................340/200 X |
| 3,235,856 | 2/1966 | Gilchrist ..............................340/187 |
| 3,246,170 | 4/1966 | Olshan.................................323/1 UX |
| 3,246,257 | 4/1966 | Evalos et al. ........................340/200 UX |
| 3,260,935 | 7/1966 | Lion.....................................324/61 X |

Primary Examiner—A. D. Pellinen
Attorney—Hofgren, Wegner, Allen, Stellman & McCord

[57] ABSTRACT

A servoed transducer uses differential sensing capacitors connected to a detector circuit to generate an error signal proportional to movement of a pivoted seismic mass. The error signal is amplified by a servo amplifier with closed loop feedback in order to maintain for a fixed error signal a constant current through a torque coil which rebalances the seismic mass. The servo amplifier output circuit presents zero impedance to an external load.

15 Claims, 2 Drawing Figures

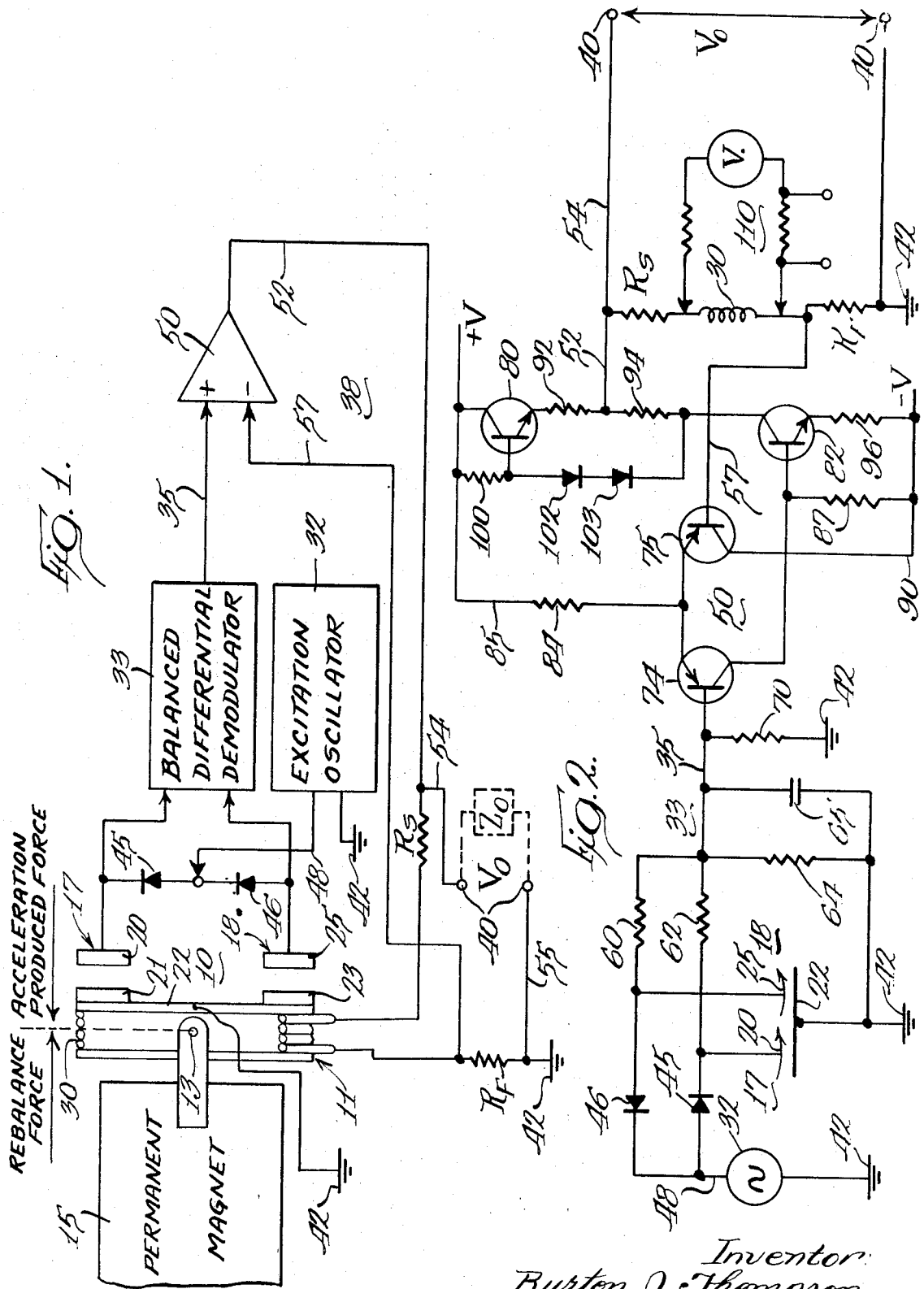

SERVOED TRANSDUCER SYSTEM WITH CURRENT OUTPUT CIRCUIT

This invention relates to an improved servoed system for rebalancing a movable element of a transducer in order to measure the external force producing unbalance in the element.

Various transducer systems having force movable sensing elements detect movement of the element and produce a locally generated rebalance force. The amount of rebalance force necessary to null the system provides a measure of the external unbalancing force which initially produced element movement. One example of such a servoed transducer system is an accelerometer of the closed loop pendulous design. Movement of a pendulum produces a signal which drives a servo amplifier in order to pass current through a torque coil which returns the pendulum to its null position. Current from the servo amplifier is also coupled to an external load to provide a measure of the rebalance force and hence the original external acceleration.

Typically, the impedance of the load may have a wide range of values. For example, the load may provide second order filtering in some applications, but not in others. In prior servo systems, different load impedances produced changes in the closed loop characteristics of the servo, introducing errors in the acceleration measurement. In an attempt to solve some of these problems, it has been known to design a servoed accelerometer of the open loop servo amplifier type, having a modified output circuit of the current electronics type, rather than the voltage electronics type. Such design, however, does not solve the problems which occur with different load impedances, nor does it provide the necessary accuracy of measurement.

In accordance with the present invention, an improved servoed transducer system provides substantially zero output impedance to an external load. As a result, variations in load impedance have substantially no effect on the closed loop characteristics of the servomechanism, increasing the accuracy of measurement. The servo amplifier uses an improved feedback circuit to form a closed loop amplifier which maintains constant current through a rebalancing torque coil when the external force has a fixed value, regardless of the impedance of the external load.

One feature of this invention is a servoed transducer system of the current electronics type, using an improved servo amplifier circuit having substantially zero output impedance to an external load. The current electronics design is achieved by use of a feedback circuit for the servo amplifier.

Further features and advantages of the invention will be apparent from the following specification and from the drawings, in which:

FIG. 1 is a partly block and partly schematic diagram of the invention in combination with an exemplary type of servoed transducer; and FIG. 2 is a schematic diagram illustrating in detail the invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

Turning to FIG. 1, a servoed transducer 10 for measuring a force quantity uses a seismic element 11 pivotally mounted at 13 to a frame structure which includes a permanent magnet 15. Transducer 10 may take the form of a force balanced accelerometer having a pendulous seismic mass which moves in response to acceleration. To detect movement of seismic element 11, a pair of differential sensing capacitors 17 and 18 are located between the seismic mass and the frame structure. Capacitor 17 is formed from a plate 20 fixed to the frame by conventional means (not illustrated) and a plate 21 fixed to a metallic member 22 on seismic mass 11. Member 22 has on an opposed end a plate 23 forming part of capacitor 18. Capacitor 18 includes a further plate 25 aligned opposite the plate 23 and fixed to the frame structure by any conventional means (not illustrated). Member 22 desirably forms the top plane surface of a bobbin around which is located a rebalancing device, as a torque coil 30.

Movement of pivoted seismic mass 11 causes a differential change in capacity in sensing capacitors 17 and 18. The change in capacity is detected by a circuit which includes an excitation oscillator 32 and a balanced differential demodulator 33 generating on a line 35 an output error signal proportional to the change in capacity. In response to the error signal, a servo amplifier 38 generates a current which flows through the torque coil 30 to generate a magnetic field. This locally generated field interacts with the magnetic field of permanent magnet 15 to produce a rebalance force which returns the seismic element 11 to its balanced or null position. The electronically generated rebalance force is thus equal and opposite to the acceleration force and maintains the pendulum 11 in a fixed "position captured" mode. The magnitude of current through torque coil 30 generates a voltage output $V_o$ across a pair of output terminals 40, to directly indicate the acceleration force.

Considering the circuit of FIG. 1 in more detail, member 22 is a metal plate which electrically joins capacitor plates 21 and 23 to a source of reference potential or ground 42. Individual capacitor plates 20 and 25 may be connected with any conventional demodulator in order to produce an output error signal on line 35. In the illustrated circuit, plates 20 and 25 are shunted by a pair of diodes 45 and 46. The junction between the diodes is connected through a line 48 to the oscillatory voltage output of oscillator 32. Servo amplifier 38, in response to the error signal on line 35, forces rebalancing current through torque coil 30 and generates output signal $V_o$ across output terminals 40. To record or analyze signal $V_o$, various types of external loads, having an impedance $Z_o$ as illustrated by the dashed lines, may be connected across terminals 40.

Servo amplifier 38 includes a differential amplifying device, such as an operational amplifier 50, having a pair of inputs labeled (+) and (−). The (+) input is directly connected to line 35. The output line 52 of amplifier 50 is coupled to ground 42 through a series circuit including scale factor resistor $R_s$, torque coil 30, and a feedback resistor $R_f$. One output terminal 40 is connected via a line 54 to the junction between line 52 and scale resistor $R_s$, while the other output terminal 40 is connected via a line 55 directly to ground 42. The voltage developed across feedback resistor $R_f$ is coupled via a feedback line 57 to the (−) input of operational amplifier 50.

Assuming the system is initially in a null state, a change in acceleration generates an error signal on line 35, producing an output on line 52 which forces current through the series combination of resistor $R_s$, torque coil 30, and feedback resistor $R_f$. When the amount of current through torque coil 30 generates a rebalance force exactly equal and opposite to the acceleration produced force, the voltage drop across feedback resistor $R_f$ equals the error signal on line 35.

Due to the separation between the feedback and torque coil path, and the voltage output path, the impedance of the external load has no effect on circuit operation, and in effect, the output impedance across terminals 40 is substantially zero. For example, when an external load is connected across terminals 40, more current from amplifier 50 is initially diverted to the load. This reduces the current through torque coil 30 and feedback resistor $R_f$, generating lesser values of rebalance force and feedback voltage. Since the feedback voltage no longer equals in absolute value the error voltage on line 35, operational amplifier 50 supplies additional current until the current through torque coil 30 and feedback resistor $R_f$ returns to its previous level. The output voltage $V_o$ also returns to its prior open circuit value. Thus, the output circuit acts as a constant voltage source, with the value of voltage being dependent solely on acceleration, and not on the load impedance $Z_o$. Also, the value of current through torque coil 30 remains constant for a fixed value of error signal on line 35.

In FIG. 2, the circuit of FIG. 1 is illustrated in detail. Oscillator 32, of conventional design, may have an AC output signal of 12 megahertz frequency, with a peak-to-peak voltage of approximately 12 volts. This signal is coupled to capacitors 17 and 18 connected in any suitable demodulator circuit 33. A resistor 60 is in series with diode 46, and a resistor 62 is in series with diode 45. These resistors are coupled to ground 42 through a common resistor 64 shunted by a capacitor 65.

In operation, the exemplary demodulator illustrated in the drawing operates on the principles disclosed in U.S. Pat. No. 3,012,192 to Lion, to which reference should be made. The resistors 60 and 62 carry opposite direction current, and form a peak charging capacitor detector. The output current on line 35 is a constant times the difference between the capacitive reactance of capacitors 17 and 18. This current produces a corresponding voltage drop across a resistor 70, connected between line 35 and ground 42, to generate a voltage input for the differential amplifier 50. While the circuit of the above identified Lion patent is illustrated, such illustration is given for completeness only, and other circuits producing a similar error voltage could be used in place of the illustrated circuit.

Differential amplifier 50 includes a pair of PNP transistors 74 and 75 connected as a differential pair in order to drive an output stage consisting of a pair of NPN transistors 80 and 82. A resistor 84 is coupled between a potential line 85, connected with a source of positive DC potential, labeled +V, and the emitters of the differential transistors 74 and 75, to form a current source for the differential transistors. In the event of a short circuit, resistor 84 limits the current that can be supplied through the collector of transistor 74 to a resistor 87 connected to a potential line 90, connected with a source of minus DC potential, labeled −V. The collector of transistor 74 is also coupled to the base of a transistor 82, so that the voltage drop across resistor 87 forms a voltage input for the output stage.

The output stage of differential amplifier 50 includes transistors 80 and 82 connected in a series circuit between the positive and negative potential sources. The collector of transistor 80 is directly connected to the positive line 85, and its emitter is coupled through resistors 92 and 94 to the collector of transistor 82. The emitter of transistor 82 is connected through a resistor 96 to the minus potential line 90. To bias transistor 80, the positive potential line 85 is connected through a resistor 100 to the base of transistor 80, and thence through a pair of diodes 102 and 103 to the junction between resistor 94 and the collector of transistor 82. Output line 52 is connected to the junction between resistors 92 and 94.

One of the terminals 40 is directly connected to line 52 via contiguous line 54. The series connected scaling resistor $R_s$, torque coil 30, and feedback resistor $R_f$ shunt line 52 to ground 42. The junction between coil 30 and resistor $R_f$ is connected via feedback line 57 to the base of transistor 75. If desired, the line 57 may be shunted to ground 42 by suitable impedance in order to damp the servomechanism, as when the transducer is an air mechanism rather than a liquid mechanism. A typical value for resistor $R_f$ is 20 ohms.

In operation, transistor 80 forms a current source for transistor 82, except for the effect of resistors $R_s$ and 100. When resistors 92 and 94 have equal values, the current through the scaling resistor $R_s$ is two times the change in current in the collector of transistor 82. When the collector current of transistor 82 goes to zero, the transistor 80 supplies two times its quiescent current to the scaling resistor $R_s$, thereby limiting the output current.

The output impedance across terminals 40 is effectively zero because the feedback resistor $R_f$ forces a fixed amount of current through the scaling resistor $R_s$ and the torque coil 30 for a given error signal on line 35, regardless of the impedance of the external load. Since the load is connected to a circuit in parallel with the torque coil circuit, the load circuit draws current separate from the current drawn by the torque coil. As a result, the external load may take a variety of forms, without altering the servo characteristics. For example, the addition of second order filtering will not change the steady state current through torque coil 30. The output as seen by the load appears to be a constant voltage source having zero internal impedance, with the magnitude of the voltage being different constant values for different values of acceleration. Many modifications may be made to the servo amplifier without losing the advantages discussed above. For example, a conventional self-test circuit 110 may be connected across the torque coil 30, to add the self-test feature to the accelerometer. Other changes and additions will be apparent to those skilled in the art.

I claim:

1. In a servoed force measuring transducer system having a transducer with an element movable from a null position in relation to the value of an unbalance force to be measured, sensing means producing an error signal in response to movement of said element, and rebalance means for causing said element to move in proportion to current therethrough, the improvement comprising:

signal translation means having an input coupled to said sensing means for passing current through said rebalance means with a magnitude proportional to the value of said unbalance force in order to move said element to the null position and for providing at output terminal means an output signal having a characteristic representing said magnitude of current passing through said rebalance means, including means maintaining the current through said rebalance means at a constant magnitude for a fixed value of said error signal, and means providing substantially zero output impedance across said terminal means.

2. The servoed transducer system of claim 1 wherein said current maintaining means includes said rebalance means in series with feedback impedance means generating a feedback signal proportional to current through said rebalance means, and means connecting said feedback impedance means to said signal translation means for subtracting said feedback signal from said error signal.

3. The servoed transducer system of claim 2 wherein said signal translation means includes differential amplifying means having a first input corresponding to said input coupled to said sensing means, a second input, and an output having an output signal proportional to the difference between signals at the pair of inputs, said subtracting means connecting said feedback impedance means to said second signal input.

4. The servoed transducer system of claim 3 wherein said differential amplifying means includes first and second variable conduction devices each having first, second and control electrodes, means connecting said first electrodes in a common path to a source of potential, said sensing means being coupled to the control electrode of said first device to form said first input, said feedback means being coupled to the control electrode of said second device to form said second input, and circuit means connected to the second electrodes of said first and second devices for generating said output signal in proportion to the difference in conduction between said first and second devices.

5. In a servoed transducer system having a transducer with an element movable from a null position in relation to an unbalance force, sensing means producing an error signal in response to movement of said element, and rebalance means for causing said element to move in proportion to current therethrough, the improvement comprising:

signal translation means having an input coupled to said sensing means for passing current through said rebalance means to move said element to the null position and for providing at output terminal means an output signal representing the unbalance force, including means maintaining the current through said rebalance means constant for a fixed value of said error signal, and means providing substantially zero output impedance across said terminal means, including means connecting said output terminal means in a path separate from and in parallel with said rebalance means, said signal translation means providing current both passing through said rebalance means and passing through a load coupled to said terminal means, whereby the current passing through the rebalance means is independent of the impedance of the load.

6. The servoed transducer system of claim 5 wherein said current maintaining means includes impedance means connected in series with said rebalance means, said separate path for said output terminal means being coupled in parallel across said rebalance means and impedance means to provide an output voltage independent of the load.

7. The servoed transducer system of claim 6 wherein said impedance means includes a feedback resistor generating a feedback signal thereacross, said current maintaining means coupling said feedback resistor to said signal translation means for subtracting said feedback signal from said error signal.

8. The servoed transducer system of claim 5 wherein said signal translation means includes means for limiting the current flow both to said rebalance means and to said separate path, thereby protecting the signal translation means from short circuiting of said output terminals.

9. The servoed transducer system of claim 8 wherein said current flow limiting means includes amplifying means for generating said current, and a constant current source for supplying current to said amplifying means.

10. The servoed transducer system of claim 1 for a servoed accelerometer wherein said element comprises a seismic mass movable from a position captured null position in response to an acceleration unbalance force, said rebalance means includes a torque coil attached to said seismic mass for generating a magnetic field proportional to current through the torque coil and a permanent magnet for generating a fixed magnetic field interacting with the magnetic field of said torque coil to rebalance said seismic mass.

11. In a servoed force measuring transducer system having a transducer with an element movable from a null position in relation to the value of an unbalance force to be measured, force sensing means for producing an error signal in response to movement of said element, and rebalance means for causing said element to move in proportion to current therethrough, the improvement comprising:
servo amplifier means coupled to said force sensing means and being responsive to said error signal for passing current through said rebalance means with a magnitude proportional to the value of said unbalance force in order to move said element to the null position and for providing at output terminal means an output signal having a characteristic representing said magnitude of current passing through said rebalance means, including
current sensing means in series with said rebalance means for generating a feedback signal proportional to the magnitude of total current through said rebalance means, and
feedback means connecting said current sensing means to said servo amplifier means for maintaining the current through said rebalance means substantially constant for a fixed value of said error signal.

12. The servoed transducer system of claim 11 wherein said current sensing means comprises impedance means in series with the rebalance means to generate a feedback voltage proportional to current through said rebalance means, and said feedback means coupling said impedance means to said servo amplifier means for subtracting said feedback voltage from said error signal.

13. The servoed transducer system of claim 12 wherein said servo amplifier means includes differential amplifying means for generating at an output a signal proportional to the difference between signals at a pair of inputs, means coupling said force sensing means to one of said pair of inputs, means coupling said output to said series connected rebalance means and impedance means, and said feedback means coupling said impedance means to the other of said inputs.

14. In a servoed transducer system having a seismic mass movable relative to a frame in response to an unbalance force to be measured, a transducer having an element affixed to said seismic mass and an element affixed to said frame for varying an electrical quantity in response to a change in spacing between said elements, and rebalance means comprising a portion consisting of a torque coil for generating a magnetic field proportional to current through the torque coil and a portion consisting of means for generating a fixed magnetic field, one of said portions being mounted to said seismic mass and the other of said portions being mounted to said frame whereby the magnetic fields interact to move said seismic mass, the improvement comprising:
detector means coupled to said elements and responsive to said electrical quantity for generating an error signal,
amplifier means coupled to said detector means and responsive to said error signal for passing current through said torque coil with a value directly proportional to the value of said unbalance force in order to generate a rebalance force equal and opposite to said unbalance force, including
constant current output means for maintaining the current through said torque coil substantially constant for a fixed value of said error signal, said constant current means comprising feedback means having a closed loop separate from the interacting magnetic fields.

15. The servoed transducer system of claim 14 wherein said feedback means includes current sensing means for generating a feedback signal proportional to current through said torque coil, and difference means connected to said detector means and said current sensing means for subtracting said feedback signal from said error signal, said closed loop comprising an electrical circuit path including said current sensing means and said difference means.

* * * * *